United States Patent

[11] 3,593,956

[72] Inventor William R. McCarty, Jr.
Skokie, Ill.
[21] Appl. No. 816,714
[22] Filed Apr. 16, 1969
[45] Patented July 20, 1971
[73] Assignee The Dole Valve Company
Morton Grove, Ill.

[54] SHUTOFF VALVE AND ARMATURE GUIDE THEREFOR
8 Claims, 4 Drawing Figs.
[52] U.S. Cl. .............................................. 251/30,
251/45, 92/98, 251/61
[51] Int. Cl. .......................................... F16k 31/385,
F16k 7/12
[50] Field of Search ................................. 251/30, 45,
46, 61; 92/98

[56] References Cited
UNITED STATES PATENTS
2,826,367 3/1958 Cobb .............................. 251/30 X
2,982,307 5/1961 Mueller ........................... 251/45 X
3,412,970 11/1968 Robarge .......................... 251/30
3,421,732 1/1969 Golden ............................ 251/61 X FOREIGN PATENTS
1,074,348 1/1960 Germany ........................ 251/30

Primary Examiner—Arnold Rosenthal
Attorney—Hill, Sherman, Meroni, Gross and Simpson ABSTRACT: Thermoplastic armature guide for the spring and armature of a solenoid controlled pressure operated diaphragm valve, for retaining and sealing the diaphragm to the body of the valve. The guide comprises an elongated cylindrical guide part having one closed end and an opposite inverted bowllike base. The bowllike base has an inner radially outwardly extending shoulder and an annular guide leg extending axially from the outer margin of the shoulder. The shoulder and guide leg form a sealing and guide for the peripheral portion of the diaphragm. The guide leg guides the diaphragm to its cavity in the valve body and accommodates the shoulder to compress and seal the peripheral portion of the diaphragm to the valve body, as the cover plate for the valve body is tightened into position. The top wall of the inverted bowllike base is abutted by the cover of the valve body, as the shoulder maintains the diaphragm in sealing engagement with the valve body. The solenoid coil for the valve has sleevelike poles pieces fitting along the plastic armature guide to reinforce and prevent distortion of the guide by the heat of the water or the heat generated by the coil.

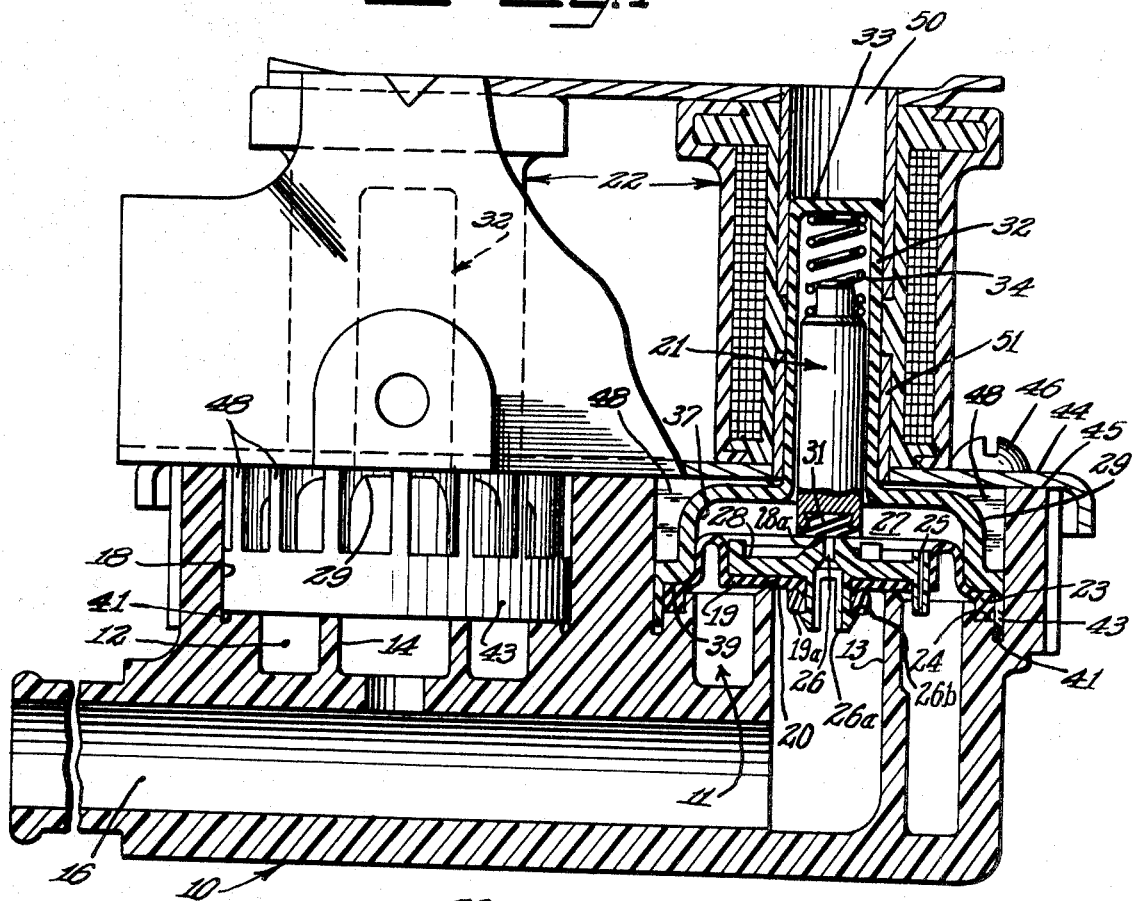
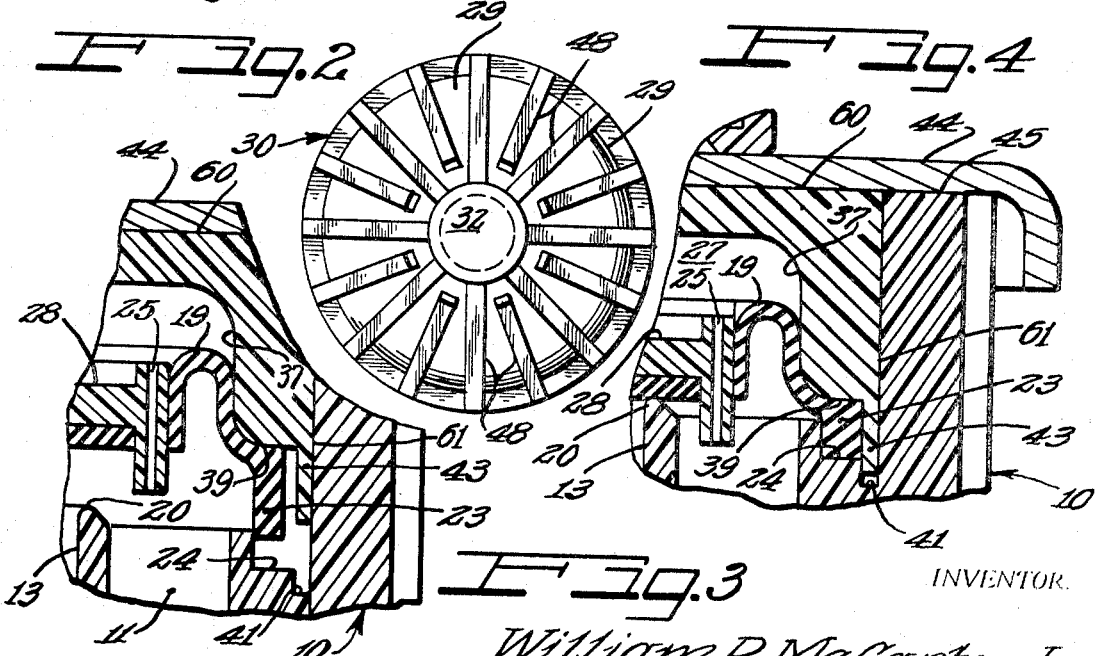
INVENTOR.
William R. McCarty, Jr.

SHUTOFF VALVE AND ARMATURE GUIDE THEREFOR

SUMMARY AND OBJECTS OF THE INVENTION

Thermoplastic armature guide for the armature and diaphragm of a solenoid controlled diaphragm shutoff valve, eliminating dissimilarity of metals between the solenoid coil, guide and armature, having a bowllike base with a guide sleeve or leg extending axially of the base guiding the diaphragm for assembly to the valve body and sealing the diaphragm to the valve body, and so arranged as to prevent distortion of the guide by the heat of the water flowing through the valve and the heat generated by the solenoid coil, and to accommodate the spring armature and diaphragm to be assembled to the guide and then readily be slipped into and sealed to a valve cavity in the valve body.

A principal object of the present invention, therefore, is to provide a simple and improved form of armature guide and diaphragm sealing means for a solenoid controlled diaphragm shutoff valve, avoiding the dissimilarity of metals between the solenoid coil and armature and so arranged as to prevent distortion of the guide and accommodate the guide to seal the diaphragm to its valve body.

Another object of the invention is to provide an improved form of thermoplastic armature guide for a solenoid controlled shutoff valve, accommodating assembly of the armature, its spring and diaphragm to the guide, and then accommodating assembly of the armature spring and diaphragm to the valve body.

Still another object of the invention is to provide a solenoid operated diaphragm valve having an improved form of thermoplastic armature guide and diaphragm sealing means, so arranged as to avoid distortion of the guide by the heat of the water flowing through the valve, and to reduce the liability of corrosion heretofore caused by the dissimilarity in metals between the guide, armature and the pole piece for the solenoid coil.

A still further object of the invention is to provide a solenoid controlled diaphragm shutoff valve arranged with a view toward facilitating assembly of the valve and reducing the likelihood of corrosion of the moving parts of the valve.

A further object of the invention is to provide a simple and improved form of thermoplastic guide for the armature of a diaphragm shutoff valve, so arranged as to avoid rupture and distortion of the guide by the heat of the water flowing through the valve.

These and other objects of the invention will appear from time to time as the following specification proceeds and with reference to the accompanying drawings.

DESCRIPTION OF THE drawings

FIG. 1 is a partial fragmentary vertical sectional view taken through a solenoid controlled diaphragm type of mixing valve with certain parts broken away and certain other parts shown in solid.

FIG. 2 is a top plan view of the armature guide shown in FIG. 1.

FIG. 3 is an enlarged fragmentary sectional view illustrating a step in the assembly of the guide and diaphragm to the body of the valve and showing a modified form of armature guide from the guide shown in FIGS. 1 and 2; and FIG. 4 is a view somewhat similar to FIG. 3, but showing the guide and diaphragm assembled to the body of the valve.

DESCRIPTION OF PREFERRED EMBODIMENT OF INVENTION

In the embodiment of the invention illustrated in the drawings, a diaphragm type of solenoid controlled mixing valve is shown of a type particularly adapted for use in appliances, such as washing machines and the like. The valve comprises basically a valve body 10 having inlets (not shown) for hot and cold water and having communication with spaced hot and cold water annular passageways 11 and 12 extending about hot and cold water ports 13 and 14 respectively. The ports 13 and 14 have communication with an outlet passageway 16 for hot, cold or tempered water.

The hot and cold water diaphragm valves and armature guides therefore are each of a similar construction so one only need herein be shown or described in detail, and the same part numbers will be applied to the same operative parts of each armature guide and valve.

The valves are each contained in an individual cavity 18 in the valve body and include a flexible annular diaphragm 19 seated on a valve seat 20, which for the hot water valve defines the port 13. The annular diaphragm 19 may be made from rubber or one of the well-known substitutes for rubber and has a peripheral sealing bead 23, rectangular in cross section and seated in an annular groove 24 extending about the annular inlet passageway 11. The diaphragm 19 also is backed up by a reinforcement plate 28 providing a thickened central portion of the diaphragm, the undersurface of which cooperates with the seat 20, to control the flow of fluid through the port 13.

The reinforcement plate 28 may be made from a thermoplastic material and has an upstanding frustoconical central portion 28a having a port 26 leading therethrough and affording communication from a chamber 27 within an enlarged inverted bowllike base 29 of a thermoplastic armature guide 30, to the outlet passageway 16 through the port 13. The plate 28 also has a bleed port 25 in the form of a tubular passageway member leading through said plate and downwardly through the diaphragm 19 adjacent the periphery of said plate. Said bleed port 25 affords communication from the annular inlet passageway 11 to the chamber 27 and has a smaller flow area than the flow area of the central port 26.

The reinforcement plate 28 further has a central depending retainer portion 26a extending through the diaphragm and forming a downward continuation of the port 26, and shown in FIG. 1 as being axially split. Said depending retainer portion has an enlarged diameter lower end portion tapering outwardly as it extends towards the diaphragm and terminating into a shoulder 26b facing the underside of the diaphragm and spaced therefrom. A retainer ring 19a is pressed along the tapered end of the retainer portion contracting said retainer portion until said retainer portion passes above the shoulder 26b into engagement with the undersurface of the diaphragm. The retainer portion will then expand radially outwardly and snap the shoulder 26b into engagement with the underside of the ring 19a, and clamp said reinforcement plate to said diaphragm.

When the port 26 is open, fluid will flow from the chamber 27 to the outlet passageway 16 through the port 26 faster than it will flow to the chamber 27 from the annular inlet passageway 11 through the port 25 which is always open. This will effect opening of the valve by the differential in pressure on opposite sides of the diaphragm 19.

When the central port 26 is closed, as by a resilient valve 31 on the lower end of the armature 21, a differential in pressure will be created on opposite sides of the diaphragm 19 to maintain the diaphragm in sealing engagement with the seat 20. If the diaphragm 19 is initially unseated, the fluid force differential will still exist since the fluid communication to the chamber 27 will have the same fluid pressure as that within the annular inlet passage 11, at the peripheral edge of the diaphragm 19, whereas the pressure on the undersurface of the diaphragm 19 will not be as great. This will lessen fluid pressure at the central portion 26 of the undersurface of the diaphragm. Closing of the central port 26 of the diaphragm 19 will thus seat said diaphragm by the differential in pressure acting on opposite sides of said diaphragm.

The armature 21 is slidably guided in a cylindrical guide tube 32 of the armature guide 30, extending along the inside of the solenoid coil 22. The guide tube 32 has a closed top 33, the inside of which forms a seat for a compression spring 34, seated at its opposite end on the armature 21 and biasing the vale 31 on the inner or lower end of said armature into engagement with the port 26. The armature guide 30 terminates at its lower end into the enlarged diameter bowllike base portion 29, cooperating with the diaphragm 19 to form the chamber 27. The inside of the enlarged diameter bowllike base portion 29 is shown as having a generally vertically extending interior cylindrical wall 37, which extends along the diaphragm 19 radially inwardly of the sealing bead 23 of said diaphragm. Said interior cylindrical wall terminates into a downwardly facing annular shoulder 39 extending radially outwardly of said cylindrical wall 37, and engaging the outer annular portion of the diaphragm 19 above and in vertical alignment with the bead 23. Said shoulder 39 serves to compress the bead 23 and press said bead into sealing engagement with the annular sealing groove 24 formed in the valve cavity 18, as the armature guide 30 is clamped to the cavity 18 of the valve body 10. The annular groove 24 terminates at its outer margin into a relatively deep narrow annular groove 41 adapted to receive an annular guide leg 43 of the armature guide 30. The guide leg 43 extends along the outside of the bead 23 and accommodates assembly of the spring 34, armature 21 and diaphragm 19 to said armature guide when positioned with the bowllike base portion 29 facing upwardly.

The guide leg 43 and shoulder 39 thus serve to guide the diaphragm 19 as inserted in the valve cavity into the annular groove 24 and to compress the bead 23 as the armature guide is moved into the valve cavity with the guide leg 43 thereof moving along the annular groove 41.

The annular groove 41 is substantially deeper than the annular groove 24. The guide leg 43 is shorter than the length of the bead 23 when in its unstressed position, and compresses the bead into sealing engagement with the groove 24 when the armature guide is in the position in the valve body shown in FIG. 4. In this position, the guide leg 43 is free from the bottom of the groove 41.

A cover plate 44 for the valve cavity 18 and a top surface 45 of the valve body may be tightened thereto, as by machine screws 46 and, as tightened to the valve body, serves to move the guide leg 43 of the inverted bowllike base portion 29 along a cylindrical wall 47 of the valve cavity into the annular recess 41, as shown in FIGS. 3 and 4 and to compress the bead 23 into the sealing groove 24, as previously described.

The armature guide 30 is made of a suitable thermoplastic or thermosetting material, which may be a Nylon plastic material. The valve body may also be made from a similar plastic material, although it need not necessarily be made from such a material. In FIGS. 1 and 2 of the drawing the bowllike base portion 29 of said armature guide is shown as having a plurality of reinforcement and strengthening ribs 48 extending radially along the top surface of the sidewall thereof, to the guide leg 43. The radial reinforcement fins 48 extend above the top of the widened inverted bowllike base portion 29 and have flat top surfaces engaging the bottom of the cover plate 44 and forming an abutment surface therefor. Said fins provide reinforcing fins for said widened bowllike base portion, to prevent distortion of said base portion of said armature guide by the heat of the hot water flowing through the valve, and may also provide heat transfer surfaces between the top of the bowllike base portion of the armature guide and the cover plate 44.

The solenoid coil 22 is shown as being an encapsulated coil in which the coil proper is encapsulated in insulating material and has a hollow interior portion having aligned spaced sleevelike pole pieces 50 and 51 extending therein. Said pole pieces may be pressed into the frame and coil after assembling the coil to its bracket and extend above and below the solenoid coil when assembled. The projecting ends of said pieces serve to secure said coil to the cover 44. The pole pieces 50 and 51 have inside diameters substantially equal to the outside diameter of the guide tube 32, to fit along said guide tube and form a support for said guide tube, to hold said guide tube from distortion.

With the thermoplastic armature guide of the present invention, the guide itself guides and seals the diaphragm valve to the valve body and retains the peripheral bead of the diaphragm in sealing engagement with the valve body, while the spaced pole pieces 50 and 51 not only serve as pole pieces for the solenoid, but also support and prevent distortion or rupture of the guide tube for the armature. The fins 48 further prevent distortion or rupture of the widened base portion 29 of the armature guide, and the top surfaces of said fins engaged by the underside of the cover plate 44 serve as reinforcements for the widened base portion 29 and as an abutment means engaged by the cover plate 44, to move the armature guide and slide leg 43 thereof along the annular recess 41, when clamping the diaphragm in position.

In FIGS. 3 and 4 of the drawing, the fins 48 have been eliminated and a top surface 60 of the inverted bowllike base is flat and is abutted by the underside of the cover plate 44. Said flat top surface 60 terminates into an axially downwardly extending cylindrical wall 61, the lower end portion of which forms the outer wall surface of the guide leg 43. This provides a top and side wall for the inverted bowllike base, which is sufficiently thick to prevent distortion of the armature guide, by heat or pressure.

The armature guide may otherwise be like the armature guide shown in FIGS. 1 and 2 and may operate on principles similar to the principles disclosed in these FIGS., so like reference numerals have been applied to like parts shown in FIGS. 1 and 2.

While several forms in which the invention may be embodied are herein shown and described, it may readily be understood that various variations and modifications in the invention may be attained without departing from the spirit and scope of the novel concepts thereof.

I claim as my invention:
1. In a solenoid controlled fluid pressure operated diaphragm shutoff valve,
   a valve body having a valve cavity therein,
   an annular inlet passageway opening to said cavity and having communication with a source of liquid under pressure,
   an outlet port,
   an annular valve seat defining said outlet port and disposed radially inwardly of said inlet passageway,
   said valve cavity having a cylindrical wall encircling said annular inlet and said outlet port and spaced equal distances from the center of said outlet port,
   an annular sealing groove extending about said inlet port,
   a flexible diaphragm cooperating with said seat to control the flow of liquid between said inlet passageway and said outlet port,
   said diaphragm having a peripheral bead extending about the outer margin thereof and seated in said annular sealing groove,
   a solenoid controlling operation of said diaphragm and the opening and closing of said valve and including an armature and an armature guide therefor having a bowllike base extending about said cylindrical wall and sealing said bead to said sealing groove,
   a reinforcement plate backing up said diaphragm and providing a central thickened portion therefor,
   said reinforcement plate having a central port leading therethrough and having a depending annular retainer portion forming a downward continuation of said port and being axially split, and extending through and beneath said diaphragm,
   said depending retainer portion having an enlarged diameter lower end portion, tapering outwardly as it extends towards said diaphragm and terminating into a shoulder facing said diaphragm, and
   a retainer ring pressed along the tapered end of said retainer portion into engagement with the undersurface of said diaphragm and retained thereto by said shoulder.
2. In an armature guide and in combination with a solenoid controlled fluid pressure operated diaphragm shutoff valve including,
   a valve body having a valve cavity therein, an annular inlet passageway opening to said cavity and having communication with a source of liquid under pressure,
an outlet port,
an annular valve seat defining said outlet port and disposed radially inwardly of said inlet passageway,
a flexible diaphragm valve cooperating with said seat and controlling the flow of liquid through said inlet passageway and said outlet port,
said diaphragm valve having a sealing bead extending axially therefrom having a cylindrical outer periphery,
an armature controlling operation of said diaphragm valve,
spring means biasing said armature into position to effect closing of said valve,
an electromagnet extending about said armature and energizable to effect movement of said armature in a direction to open said valve,
said armature guide including a generally cylindrical guide for said armature and extending within said electromagnet,
an outer end for said cylindrical guide forming a seat for said spring,
an inverted bowllike base extending generally radially of the opposite end of said guide from said outer end having an interior bowllike wall having an annular shoulder extending radially outwardly therefrom, and having an annular guide leg extending axially of the outer margin of said shoulder in a direction away from said cylindrical guide.
said shoulder and annular guide leg forming a container for said diaphragm valve, and said guide leg surrounding the outer periphery of said sealing bead when said spring, armature and diaphragm valve are assembled to said armature guide, and having slidable engagement with said cavity and cooperating with said shoulder to seal said diaphragm to said valve body as slidably moved in position in said cavity.

3. The armature guide of claim 2
wherein said armature guide is made from a thermoplastic material,
wherein said inverted bowllike base has an outer top abutment surface terminating into a generally vertically extending outer cylindrical wall forming an outer wall surface of said guide leg, and
wherein said outer top abutment surface serves as an abutment means for bringing said annular sealing bead into sealing engagement with said cavity and for retaining said armature guide in position in said valve and into clamping and sealing engagement with said diaphragm.

4. The armature guide of claim 2
wherein the armature guide is made from a thermoplastic material,
wherein said inverted bowllike base has an outer top abutment surface terminating into a generally vertically extending outer cylindrical wall surface forming the outer wall surface of said guide leg,
wherein a cover plate is provided for said valve body, and
wherein clamping means are provided for clamping said cover plate into clamping engagement with said outer top abutment surface and to bring said shoulder into compressive engagement with the peripheral portion of said diaphragm, to compress and seal the peripheral portion of said diaphragm to said valve cavity.

5. The armature guide of claim 2
wherein an annular sealing groove having a bottom wall is disposed radially outwardly of said inlet passageway,
wherein an annular guide groove defines the outer margin of said sealing groove, and
wherein said annular guide groove has an outer wall forming a downward continuation of said wall of said valve cavity and extends beneath said bottom wall of said sealing groove, to accommodate the sliding of said guide leg along said wall of said cavity into said annular guide groove, upon the clamping of said armature guide to said cavity and the sealing of said bead to said annular sealing groove.

6. The armature guide of claim 5
wherein said armature guide is made of thermoplastic material, and
wherein the depth of said annular guide groove relative to the length of said annular guide leg is such that said annular guide leg will never bottom on said guide groove when said armature guide is in full clamping engagement with said annular sealing bead.

7. The armature guide of claim 2
wherein the armature guide is made from a thermoplastic material,
wherein the electromagnet has a vertically extending hollow interior portion having spaced metallic sleeves extending axially along the central portion thereof, the inside diameters of which are substantially equal to the outside diameter of said armature guide, and supporting said armature guide from rupture and distortion.

8. The armature guide of claim 2
wherein said armature guide is made form a thermoplastic material,
and wherein radial fins extend along the outside of said inverted bowllike base above the top surface thereof, the top surfaces of which provide flat abutment surfaces and a reinforcing means for said inverted bowllike base of said armature guide.